United States Patent [19]
Chilson

[11] Patent Number: 6,087,013
[45] Date of Patent: Jul. 11, 2000

[54] GLASS COATED HIGH STRENGTH STEEL

[75] Inventor: Dennis Chilson, Birmingham, Ala.

[73] Assignee: Harsco Technologies Corporation, Fairmont, Minn.

[21] Appl. No.: 08/091,030

[22] Filed: Jul. 14, 1993

[51] Int. Cl.⁷ ........................................................ B32B 9/00
[52] U.S. Cl. ........................ 428/432; 428/433; 428/469; 428/471; 428/472; 428/911; 427/376.2; 427/376.5
[58] Field of Search ........................ 428/469, 471, 428/472, 432, 433, 911; 148/335, 336, 403; 420/108, 112; 427/376.2, 376.5

[56] References Cited

U.S. PATENT DOCUMENTS

| | | |
|---|---|---|
| 1,660,790 | 2/1928 | Herman . |
| 2,012,765 | 8/1935 | Marthourey . |
| 2,791,500 | 5/1957 | Foley et al. . |
| 3,175,937 | 3/1965 | Bayer et al. . |
| 3,266,947 | 8/1966 | Steiner . |
| 3,300,339 | 1/1967 | Perri et al. . |
| 3,379,582 | 4/1968 | Dickinson . |
| 3,401,025 | 9/1968 | Whitney . |
| 3,473,999 | 10/1969 | Muchow . |
| 3,906,125 | 9/1975 | Uher . |
| 3,962,490 | 6/1976 | Ward . |
| 3,971,120 | 7/1976 | Ruderer . |
| 3,990,860 | 11/1976 | Fletcher et al. . |
| 4,110,487 | 8/1978 | Rion . |
| 4,198,249 | 4/1980 | Roper, Jr. et al. . |
| 4,301,213 | 11/1981 | Davies . |
| 4,328,032 | 5/1982 | Mancini et al. . |
| 4,588,655 | 5/1986 | Kushner . |
| 4,592,958 | 6/1986 | Mosser et al. . |
| 4,608,742 | 9/1986 | Ferguson et al. . |
| 4,617,056 | 10/1986 | Mosser et al. . |
| 4,724,172 | 2/1988 | Mosser et al. . |
| 4,906,524 | 3/1990 | Takao . |
| 4,996,083 | 2/1991 | Moser et al. . |
| 5,002,903 | 3/1991 | Lim et al. . |
| 5,037,478 | 8/1991 | Okai ......................................... 106/479 |
| 5,112,698 | 5/1992 | Horvei et al. . |

OTHER PUBLICATIONS

Atlas AHT 28 Machinery Steel, pp. 33–36.

*Primary Examiner*—Timothy M. Speer
*Attorney, Agent, or Firm*—Alan G. Towner; Eckert Seamans Cherin & Mellott, LLC

[57] ABSTRACT

A high strength, high toughness glass coated steel composite material is provided which exhibits greatly increased ballistic properties over the uncoated steel. A borosilicate glass coating is fused onto the surface of the steel in a process which heats the steel and an aqueous slurry of the borosilicate glass to a temperature which is suitable for both fusing the glass to the steel and for providing a heat soak for the steel to air harden the steel to a hardness suitable for a ballistic steel. The nickel content of the steel promotes the bonding strength of the glass coating to the steel, and the borosilicate glass may contain a cobalt additive to also promote increased bonding strength.

16 Claims, 1 Drawing Sheet

GLASS COATED HIGH STRENGTH STEEL

BACKGROUND OF THE INVENTION

1. Field of the Invention

The present invention relates to a high strength steel having a borosilicate glass coating bonded thereto, which increases the ballistic efficiency of the steel, and which yields a highly wear-resistant material.

2. Description of Related Art

Ballistic steels have heretofore been developed for use as armor on military vehicles, among other things. The principal material properties which provide a steel with the ability to defeat various projectile threats are its high hardness, coupled with a high impact toughness or strength, and a uniformity of these properties throughout the material. As used herein, the term ballistic steel will generally refer to steels having a Brinell hardness of about 477 and above. In efforts to improve the ballistic performance of these steels, ceramics and aramids have been proposed for use in combination with the steel for ballistic reinforcement, but each of these types of materials has certain disadvantages for use in particular armor services, such as in underbody panels for relatively light vehicles.

Ceramic coating of steels is generally known in the art, primarily in services in which corrosion and/or abrasion resistance is required. However, as noted for example in U.S. Pat. No. 4,328,032, issued to Mancini et al., the process by which the ceramic coating is applied can cause the steel to lose its desired material properties.

Another problem with conventional ceramic coatings is that they often bond poorly to steel. Both the degradation of material properties and the poor bonding can give rise to unsatisfactory performance in resisting or defeating high blast forces and fragmentation-type threats. In fact, a poorly bonded ceramic coating would not likely hold up well in an underbody panel application against rocks and debris encountered in normal military transit. A cracked or spalled ceramic coating would reduce the ballistic properties of the panel to at or near the levels of the bare steel.

To the knowledge of the present inventor, because of problems such as poor bondability, the practical uses of ceramics in combination with ballistic steel for armor plate have been limited to applications in which preformed ceramic panels or plates are glued to the steel or are affixed thereto by mechanical means such as hook-and-loop (Velcro) fasteners.

The use of aramids as ballistic reinforcement material for steel plate is a very high cost solution, and for the most part, the increased cost cannot be justified in terms of the increased performance obtained.

Increasing the plate thickness of a ballistic steel will increase its ballistic properties, but with increased thickness comes the attendant increased weight. This is an undesirable solution in most instances, and is an unacceptable solution in certain instances. As an example, in the case of the military armored Hummer vehicle, supplied by AM General, it has been determined that increased underbody protection against fragmentation-type threats, which, in the case of pipe bombs and hand grenades, combine high blast forces and random-sized fragments travelling at high speed, is necessary. However, due to stringent weight requirements on that vehicle, it is not possible to simply provide a heavier-wall version of a ballistic steel armor employed as side armor on the vehicle.

Glass-coated steels have also been developed, outside the field of ballistic materials, for storage tanks and other storage structures, with the glass coating being provided principally as a corrosion resistant layer. One example of a glass-coated steel is used in the Harvestore® feed storage structure, which employs a Permaglas® borosilicate glass coating on both the inner and outer surfaces of the steel sheet. Harvestore® and Permaglas® are registered trademarks of the A. O. Smith Corporation, the manufacturer of the Harvestore® structure. The coating on the outer surface resists corrosion due to weather conditions, and the coating on the inner surface of the structure resists corrosive attack by materials stored therein. Such coatings have not heretofore been disclosed for use in ballistic material applications.

It is a principal object of the present invention to provide a glass-coated steel composite product having improved ballistic properties.

It is an additional principal object of the present invention to provide a glass coated ballistic steel composite product having improved capability to withstand and defeat fragmentation-type threats.

It is a further object of the present invention to provide an underbody panel for a vehicle having improved ballistic properties capable of providing protection against fragmentation-type threats to the occupants and/or cargo carried by the vehicle.

It is a further object of the present invention to provide a high strength, high toughness glass coated steel having an impact resistant and wear resistant glass coating thereon.

SUMMARY OF THE INVENTION

The above and other objects of the present invention are realized by providing a glass coating on a known ballistic steel, marketed by Astralloy Wear Technology, an operating unit of Harsco Corporation, the assignee of the present invention, under the registered trademark BP6:33®, which has a composition within the range set forth in U.S. Pat. No. 3,379,582, issued to Dickinson, which is herein incorporated by reference.

This ballistic steel has been demonstrated in the course of the development of the present invention to have several attributes making it especially compatible with a borosilicate glass coating. The preferred normalizing and air hardening temperature of this steel is 1650° F., which coincides substantially to the temperature at which a borosilicate glass coating is applied and fused to the steel, which thus permits the glass bonding and steel hardening to take place in a single operation. In contrast, other conventional armor plate would, like many other steels, lose hardness in the process of fusing the glass coating to the steel. Thus, in those materials, any possible increase in ballistic efficiency resulting from the addition of the glass coating would be partially or completely offset by the reduction in hardness of the base material. Additionally, the ballistic steel employed in the glass coated steel composite of the present invention has a nickel content in excess of 3.25 weight percent, which promotes the bonding of the borosilicate glass to the steel.

The resultant glass-coated high strength steel composite product exhibits greatly enhanced ballistic properties even with relatively thin layers of glass coating. Improvements of 20% and greater in the V50 (a measure of probable ballistic limit) of the coated steel over the uncoated steel have been demonstrated in standard simulated fragmentation attacks with glass coating thicknesses as low as 0.015". Live ballistic tests against threats which might actually be encountered have demonstrated that the glass coated high strength steel has the necessary ballistic properties to defeat many potential battlefield threats even using steel and coating thicknesses which are relatively thin, thus providing great potential for weight savings on military vehicles.

BRIEF DESCRIPTION OF THE DRAWINGS

These and other features of the present invention and the attendant advantages will be readily apparent to those having ordinary skill in the art, and the invention will be more easily understood from the following detailed description of the preferred embodiment of the present invention taken in conjunction with the accompanying drawing, wherein.

DETAILED DESCRIPTION OF THE PREFERRED EMBODIMENT

Figure 1:
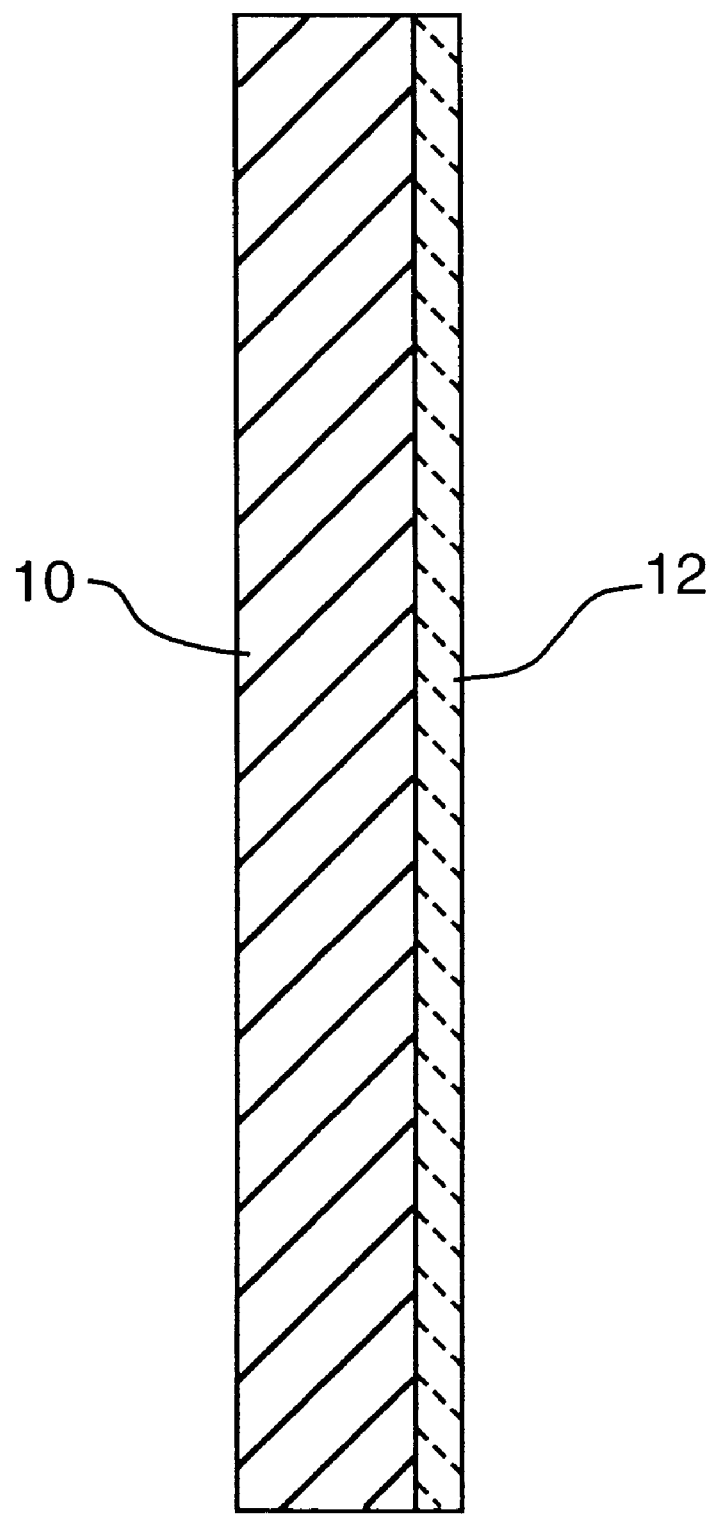
FIG. 1 is a cross-sectional view of a steel plate having a glass coating fused thereto, in accordance with a preferred embodiment of the present invention.

FIG. 1 illustrates a representative cross-section of a steel plate or sheet 10, to which a glass coating 12 has been fused. The glass coating 12 may be applied to one side of the steel plate 10, as shown, or may be applied to cover both sides of the plate, or other predetermined portions of the plate. It is further contemplated that the steel may be formed into components such as fan blades which would have the glass coating fused thereto. In an armor plate application, it is contemplated that the steel plate will be coated substantially completely over one surface thereof, with the glass coated side to be deployed facing outwardly to the potential threats.

The preferred steel composition employed in the glass coated steel of the present invention falls within the following compositional range:

TABLE I

| Element | Wt. % range |
|---|---|
| Carbon | 0.20–0.30 |
| Manganese | 0.80–1.20 |
| Nickel | 3.25–4.00 |
| Chromium | 1.25–2.00 |
| Molybdenum | 0.25–0.50 |
| Silicon | 0.20–0.50 |
| Sulfur | 0.04 max. |
| Phosphorous | 0.04 max. |
| Iron | Balance |

This compositional range was originally disclosed in U.S. Pat. No. 3,379,582, issued to Dickinson.

A further preferred compositional range for enhanced ballistic properties is as follows:

TABLE II

| Element | Wt. % range |
|---|---|
| Carbon | 0.20–0.30 |
| Manganese | 0.80–1.00 |
| Nickel | 3.25–3.75 |
| Chromium | 1.25–1.75 |
| Molybdenum | 0.25–0.35 |
| Silicon | 0.20–0.35 |
| Sulfur | 0.01 max. |
| Phosphorous | 0.01 max. |
| Iron | Balance |

The lower maximum concentrations of sulfur and phosphorous provide a steel in which the desired strength and toughness properties will be more uniform, as these elements act as inclusions and create defects in the steel. Such defects have the potential to act as points of weakness, and the minimization of such defects ensures increased uniformity of the material properties.

An especially preferred compositional range for obtaining enhanced ballistic properties in the steel is as follows:

| Element | Wt. % range |
|---|---|
| Carbon | 0.24–0.28 |
| Manganese | 0.88–1.00 |
| Nickel | 3.50–3.60 |
| Chromium | 1.44–1.60 |
| Molybdenum | 0.26–0.28 |
| Silicon | 0.25–0.32 |
| Sulfur | 0.005 max. |
| Phosphorous | 0.010 max. |
| Iron | Balance |

In accordance with the present invention, a steel part, referred to generically herein as an element, having a composition falling within the above-stated ranges is coated, over at least a predetermined portion thereof, with a borosilicate glass. When the part is to be employed as an armor panel, such as a side panel or underbody panel for a military vehicle, the steel part will be in sheet or plate form, preferably having a thickness of ⅛" or greater.

The bonding or fusing of glass coatings in general, and borosilicate glasses in particular, has previously been disclosed in the art, for example, in U.S. Pat. No. 4,110,487, herein incorporated by reference. As further noted in U.S. Pat. No. 4,328,032, various known steel alloys have suitable compositions which promote the fusing or bonding of the glass thereto, but many such alloys undergo a serious degradation of their mechanical properties during the fusion process. The primary object of the invention in that patent was to develop an alloy having good glass fusion properties, and which would retain certain levels of tensile strength and low temperature (−20° F.) impact strength (Charpy "V" notch), particularly for use in producing glass lined pressure vessels.

In the present invention, the presence of nickel in the steel at the stated range has been found to promote the bonding of a borosilicate glass thereto, and at the same time, in combination with the other alloying elements, provide a steel whose air hardening temperature coincides with temperatures employed in the glass fusion process. As a result, the steel will not experience any degradation of its desired properties during the glass fusion process, but instead, in the process of fusing the glass to the steel, a temperature of 1650° F. will be maintained for a sufficient length of time to both fuse the glass to the surface of the steel and to provide sufficient soak time to allow the steel to air harden substantially uniformly throughout its thickness. In general, a soak time of one hour per inch of thickness is required, while the length of time to obtain fusion of the glass to the steel is generally on the order of fifteen minutes.

While it is believed that any number of known borosilicate glass coatings available on the market will provide the steel with the desired enhanced ballistic properties, one borosilicate glass which has been demonstrated to be suitable for this steel is the Permaglas® borosilicate glass coating employed by the A. O. Smith Corporation in manufacturing glass coated farm storage structures. The specific composition of this borosilicate glass is not known to the inventor herein, however, it is known that cobalt oxide is one additive present in the slip employed to form a Permaglas® borosilicate coating on a steel surface. This additive is believed to promote improved fusing of the coating to the steel. The Permaglas® coating material is prepared as an aqueous sprayable slurry, or slip, for application to steel surfaces.

The process for producing the high strength glass coated steel composite of the present invention involves fabricating a component, e.g., plate, sheet, or shaped part, of a steel having a composition in the range set forth in any of Tables I, II or III above; applying a slip containing a finely ground borosilicate glass composition to the surface or surfaces of the steel which are to be coated; heating the component and slip to a glass fusing temperature, typically on the order of 1650° F., for a time sufficient to form and fuse the borosilicate glass to the component, typically fifteen minutes; air hardening the steel component at a temperature on the order of 1650° F. by maintaining the glass fusing temperature for a period of time sufficient to heat soak the steel component throughout its thickness, typically one hour per inch of thickness, and air cooling the resultant glass coated component. The glass-steel bond is a combination mechanical bond and chemical bond, in that metallic ions, e.g., from the cobalt oxide, bond with the iron (Fe) in the steel.

Comparative ballistic tests of a glass coated steel composite in accordance with the present invention, employing a 0.015" thick and a 0.030" thick Permaglas® coating on a 3/16" plate of the BP6:33® steel and an uncoated 3/16" thick BP6:33® steel have been conducted in accordance with the procedures in MIL-STD-662E, using a .22 caliber, 17 grain fragment simulator, with the results summarized as follows:

TABLE IV

| Target Material Thickness, in. | | V50 Limit | % increase over uncoated |
|---|---|---|---|
| BP6:33 | Glass | (feet per second) | BP6:33 |
| .188" | none | 3094 fps | — |
| .188" | .015" | 3771 fps | 21.8 |
| .188" | .030" | 4036 fps | 30.4 |

Various other ballistic tests have been conducted employing other ballistic threats, and in virtually each instance, enhanced ballistic properties similar to those above have been demonstrated. The V50 values for the glass coated BP6:33® steel evidenced in Table IV about are on the order of V50 values required for certain military applications as measured against the ballistic threat employed in those tests. In one actual field demonstration, it was shown that a 1/8" thick BP6:33® steel plate with a Permaglas® glass coating of 0.030" performed substantially equally to a 1/4" thick uncoated BP6:33® plate against a particular threat. As the weight of the coating is almost negligible as compared with the weight of the steel, this shows that weight savings on the order of 50% may be attainable while preserving equal ballistic efficiency.

As such, the glass coated BP6:33® material shows great promise as a low weight, highly effective material for use as armor plate on military vehicles. It is thus anticipated that the military applications for the material will be greatest where weight of the armor is a critical factor.

The glass coated BP6:33® material may, of course, have applications outside the field of armor plate, particularly in other applications requiring a high strength, high hardness, and high degree of toughness base material, and where increased wear resistance or a low coefficient of friction surface are needed.

Although specific details have been discussed in the foregoing description of the preferred embodiment, it is to be appreciated that this is for illustrative purposes only. Various modifications and adaptations may readily become apparent to those skilled in the art. Accordingly, the scope of the present invention is to be determined by reference to the appended claims.

What is claimed is:

1. A high-strength, high toughness composite material comprising:

an air hardened steel element having a normalization temperature of approximately 1650° F. and a composition consisting essentially of:

| | |
|---|---|
| 0.20–0.30 wt. % | Carbon, |
| 0.80–1.20 wt. % | Manganese, |
| 3.25–4.00 wt. % | Nickel, |
| 1.25–2.00 wt. % | Chromium, |
| 0.25–0.50 wt. % | Molybdenum, |
| 0.20–0.50 wt. % | Silicon, |
| 0.04 max. wt. % | Sulfur, |
| 0.04 max. wt. % | Phosphorous, and the balance iron; | said composite material further comprising a borosilicate glass coating fused to a surface of said steel element over at least a portion of said steel element, whereby said portion of said composite material has a V50 value which is greater than a V50 value of the steel element alone.

2. A composite material as recited in claim 1 wherein said steel has a hardness on the order of 477 Brinell Hardness Number (BHN).

3. A composite material as recited in claim 1 wherein said borosilicate glass coating has a thickness greater than about 0.015 inches.

4. A composite material as recited in claim 1 wherein said steel element is a steel plate.

5. A composite material as recited in claim 1 wherein said steel element has a composition consisting essentially of:

| | |
|---|---|
| 0.20–0.30 wt. % | Carbon, |
| 0.80–1.00 wt. % | Manganese, |
| 3.25–3.75 wt. % | Nickel, |
| 1.25–1.75 wt. % | Chromium, |
| 0.25–0.35 wt. % | Molybdenum, |
| 0.20–0.35 wt. % | Silicon, |
| 0.010 max. wt. % | Sulfur, |
| 0.010 max. wt. % | Phosphorous, and the balance iron. |

6. A composite material as recited in claim 5 wherein said steel element has a composition consisting essentially of:

| | |
|---|---|
| 0.24–0.28 wt. % | Carbon, |
| 0.88–1.00 wt. % | Manganese, |
| 3.50–3.60 wt. % | Nickel, |
| 1.44–1.60 wt. % | Chromium, |
| 0.26–0.28 wt. % | Molybdenum, |
| 0.25–0.32 wt. % | Silicon, |
| 0.005 max. wt. % | Sulfur, |
| 0.010 max. wt. % | Phosphorous, and the balance iron. |

7. A composite material as recited in claim 1 wherein said borosilicate glass coating contains an additive comprising cobalt.

8. A high-strength, high toughness, ballistic steel composite material comprising:

an air hardened steel element having a normalization temperature of approximately 1650° F. and a nickel content greater than or equal to 3.25 wt. %, said composite material further comprising a borosilicate glass coating fused to at least a first surface of said steel plate element, whereby said composite material has a V50 value which is greater than a V50 value of the steel element alone.

9. A ballistic steel composite as recited in claim 8 wherein said glass coating covers both a front and a back surface of said steel plate.

10. A ballistic steel composite as recited in claim 8, wherein the borosilicate glass coating contains an additive comprising cobalt.

11. A ballistic steel composite as recited in claim 8, wherein the steel plate is air hardened to a hardness on the order of 477 Brinell Hardness Number (BHN).

12. A ballistic steel composite as recited in claim 8, wherein the glass coating has a thickness greater than approximately 0.015".

13. A ballistic steel composite as recited in claim 12, wherein the glass coating has a thickness on the order of 0.025"–0.035".

14. A ballistic steel composite as recited in claim 12, wherein said steel plate has a thickness greater than or equal to about 1/8".

15. A ballistic steel composite as recited in claim 14, wherein said steel plate has a thickness in the range of about 1/8"–1/4".

16. A method for producing a high strength, high toughness ballistic steel composite material comprising the steps of:

(a) forming a steel element having a composition consisting essentially of:

| | |
|---|---|
| 0.20–0.30 wt. % | Carbon, |
| 0.80–1.20 wt. % | Manganese, |
| 3.25–4.00 wt. % | Nickel, |
| 1.25–2.00 wt. % | Chromium, |
| 0.25–0.50 wt. % | Molybdenum, |
| 0.20–0.50 wt. % | Silicon, |
| 0.04 max. wt. % | Sulfur, |
| 0.04 max. wt. % | Phosphorous, and the balance iron; |

(b) depositing an aqueous slurry containing borosilicate glass on said steel element;

(c) heating said steel element and said aqueous slurry to a temperature on the order of 1650° F. and holding said temperature for the longer of:
  (i) a time necessary to fuse said glass coating to said steel element, and
  (ii) a time calculated at one hour, or fraction thereof, for each inch, or fraction thereof, of thickness of said steel element; and (d) subsequently air cooling said composite material.

* * * * *